(12) United States Patent
Ayen et al.

(10) Patent No.: US 6,502,687 B1
(45) Date of Patent: Jan. 7, 2003

(54) SEPARATING CONVEYOR FOR THE TRANSFER OF UNIT LOADS

(75) Inventors: Erwin Ayen, Babenhausen; Wolfgang Grein, Langen; Heinrich Droste, Sinsheim, all of (DE)

(73) Assignee: Mannesman AG, Dusseldorf (DE)

( * ) Notice: Subject to any disclaimer, the term of this patent is extended or adjusted under 35 U.S.C. 154(b) by 0 days.

(21) Appl. No.: 09/555,985

(22) PCT Filed: Dec. 8, 1998

(86) PCT No.: PCT/DE98/03669

§ 371 (c)(1),
(2), (4) Date: Jul. 19, 2000

(87) PCT Pub. No.: WO99/29601

PCT Pub. Date: Jun. 17, 1999

(30) Foreign Application Priority Data

Dec. 9, 1997 (DE) .......................... 197 56 303

(51) Int. Cl.[7] .............................................. B65G 47/52
(52) U.S. Cl. .............................................. 198/370.04
(58) Field of Search ........................ 198/370.04, 465.1, 198/867.11, 803.6, 867.04

(56) References Cited

U.S. PATENT DOCUMENTS

| | | | | |
|---|---|---|---|---|
| 3,662,874 A | * | 5/1972 | Muller .................... | 198/155 X |
| 5,255,774 A | * | 10/1993 | Yokoya ................... | 198/365 X |
| 5,301,790 A | * | 4/1994 | Prydtz et al. ........... | 198/349 X |
| 5,381,882 A | * | 1/1995 | Ostholt ................... | 198/365 X |
| 5,662,206 A | * | 9/1997 | Baum et al. ............ | 198/370.04 |
| 5,664,660 A | * | 9/1997 | Prydtz et al. ......... | 198/370.04 |
| 5,871,084 A | * | 2/1999 | Kasik ..................... | 198/803.6 |
| 6,152,280 A | * | 11/2000 | Bruun .................... | 198/370.04 |
| 6,158,568 A | * | 12/2000 | Erceg et al. ........... | 198/370.04 |
| 6,193,074 B1 | * | 2/2001 | Baum et al. ............ | 209/606 X |
| 6,231,293 B1 | * | 5/2001 | Ostholt et al. .......... | 414/418 X |

FOREIGN PATENT DOCUMENTS

| | | |
|---|---|---|
| DE | 2151439 | 4/1972 |
| DE | 4220117 A1 | 2/1993 |
| DE | 4341715 C1 | 11/1994 |
| DE | 19755877 A1 | 8/1998 |
| WO | WO 9825842 | 6/1998 |

* cited by examiner

Primary Examiner—Donald P. Walsh
Assistant Examiner—Kenneth W Bower
(74) Attorney, Agent, or Firm—Van Dyke, Gardner, Linn & Burkhart, LLP

(57) ABSTRACT

A separating conveyor for transferring unit loads, in particular air luggage, from a conveyor belt (3) to at least one adjacent branching conveyor, has traveling undercarriages (7) arranged one after the other in the transport direction (F), movable along a guiding rail (6) and interconnected by driven traction means (4) to form an endless revolving chain, and tilting arms (8) arranged on the undercarriages (7), a coupling rod (12) being joined to each tilting arm (8) outside of its axis (9) to ensure the tilting movement of the tiling arms (8). In order to ensure the rotation of the tilting arms (8) about the axis (9) over a switchable switching element (17), the guiding roller (14) can be deflected into a tilting rail (16) vertically offset in relation to the guiding rail (15). The switching rail (41) can be swiveled by a cam gear in the manner of a Maltese cross having a driven pin disk (34) oriented transversely to the transport direction and which engages with a pin (35) a slot (36) in a slotted disk (37). A connection rod (40) is mounted on the slotted disk (37) for converting the rotary movement of the slotted disk (37) into an up and down movement of the switching rail (41).

71 Claims, 6 Drawing Sheets

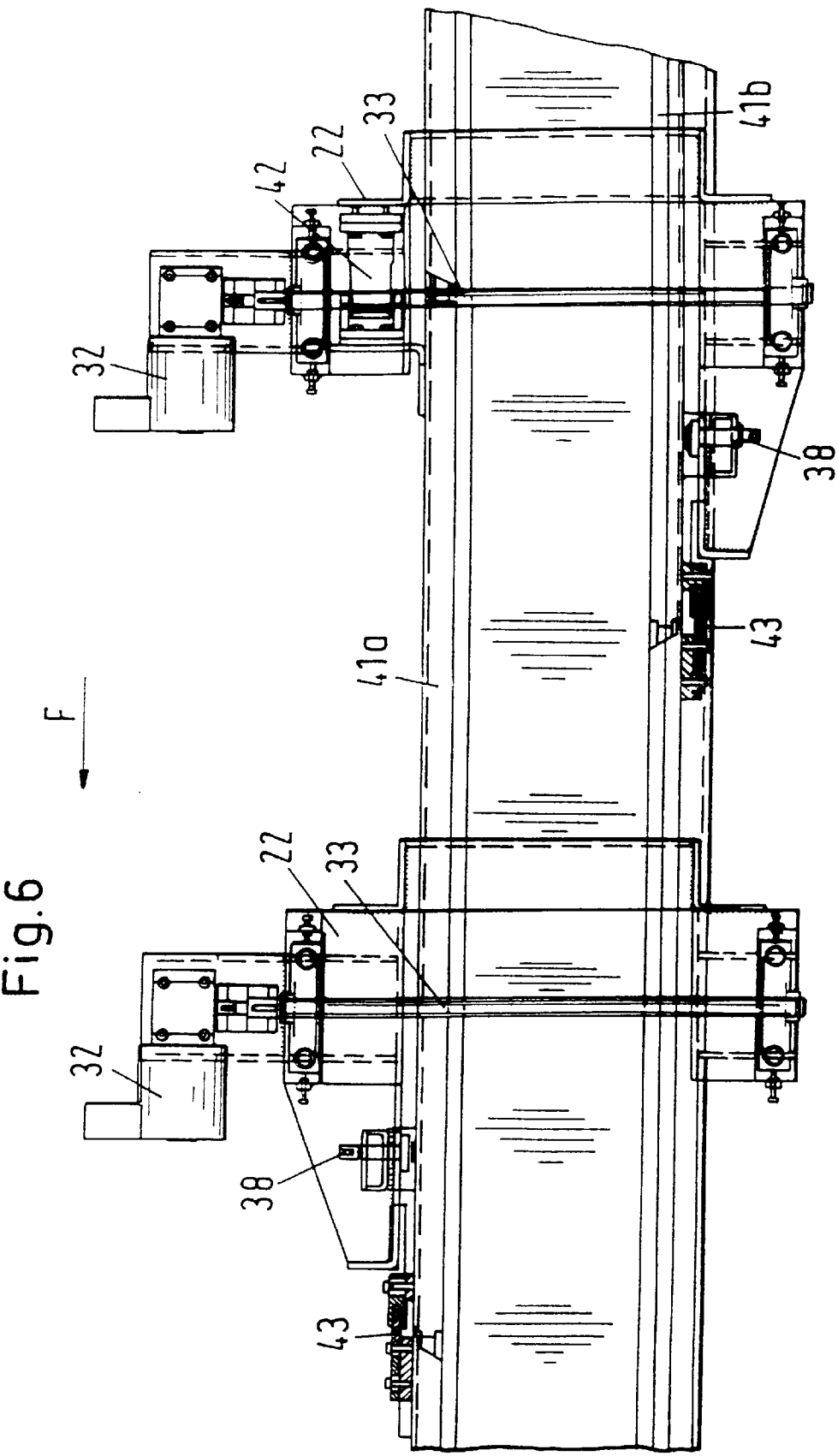

SEPARATING CONVEYOR FOR THE TRANSFER OF UNIT LOADS

TECHNICAL FIELD AND BACKGROUND OF THE INVENTION

The invention refers to a separating conveyor for the transfer of unit loads, in particular of pieces of airplane luggage, as per the preamble of Claim 1. From the (printed) German Pat. specifications DE 42 25 491 C1, an installation/ device for emptying containers is known, which is arranged along the conveyor's path. The containers serve primarily to transport individual pieces of airplane luggage. The installation for emptying the containers consists essentially of several fixed, spaced out and consecutively mounted tilting arms, pivotably mounted in the transport direction; their centers rest on an axis extending in the transport direction and allowing the arms to be swiveled to both sides. Furthermore, the area of the installation for emptying the containers is provided with disc-shaped carrier rollers of the roller conveyor type, which—seen in the transport direction—are arranged consecutively and in single file. The design/execution of the carrier rollers and the lower surface of the containers provided with a central, continuous slot in the transport direction are chosen in such a way that carrier-roller-supported containers can be tilted on the carrier rollers—to either side—to up to approx. 45°. The tilting movement that serves to let the transported container contents slide down to the branching (off) conveyor that runs adjacent to the emptying installation is carried out by the two-armed tilting arms. For this purpose, the tilting arms are provided, at their opposite ends, with guides in the form of guide rollers that are pivotable around horizontal axles, which engage- in correspondingly arranged guide bars-webs on the container in order to transfer the tilting arms' swivel movement to the containers. The distance between the tilting arms, successively arranged in the transport direction, is less than the length of the containers, so that the containers can be transferred during the tilting action to the following transport-direction-oriented tilting arm, which is in the same tilting position.

This emptying/unloading installation is suitable for a large number of applications, its outstanding characteristic being the fixed placement of the tilting arms. However, the transfer (flow) rate is limited by the fact that there has to be a sufficiently large gap between each of the containers to be emptied, so that the tilting arms have sufficient time to return from the swung-out position to the horizontal position for accepting the next container.

Furthermore, also already known from the German patent specifications DE 21 51 439 C2, is a tilting installation for unit loads that is arranged along the path of the conveyor, and consists, essentially, of dish-shaped carrier units, movable in the transport direction, which—in order to off-load the unit loads—are pivotable, either to the right or the left side, around an axis proceeding in the transport direction. As a result, the unit loads can be transferred, specifically, to an adjacent separation conveyor. Each of the dish-shaped carrier units is mounted, via a tilting arm, on individual traveling undercarriages, which are linked consecutively to each other in the transport direction. Thus, the traveling undercarriages form an endless revolving chain, that is guided around a reversing guiding wheel at the junction points with the adjacent conveyor belt. For the tilting action, the load units are transferred from the adjacent conveyor belt to the chain's upper stringer, and will either be tipped out in the direction of the branching off conveyor belt, or will be transferred, for further transport, to the conveyor belt that adjoins the tilting installation. The dish-shaped carrier unit's tilting movement is effected by a lever arm that engages the tilting arm. Essentially, this lever arm extends perpendicularly downwards, and at its end, facing away from the tilting arm, it is provided with a guide roller. The guide roller is carried in a track that runs alongside the stadium-shaped, circular-running traveling path of the carriers units. This locks the dish-shaped carrier unit into its horizontal position. For tilting purposes, switchable switches are provided along the guide, which permit rerouting—according to the desired tilting direction, either to the right or left of the guide roller—to a tilting rail that is arranged either above or below the guiding rail. By rerouting the guide roller, the lever arm is drawn, accordingly either downwards, or it is pushed upwards, whereby the dish-shaped carrier unit is swiveled to the right or left. The shifting of the switching elements is effected via a double-acting pneumatic cylinder, whose horizontally oriented movement is converted—via two interacting rollers, each provided with a guide bar bracket—into swiveling the switches in a vertical direction.

It is the task of the present invention to create a separation conveyor for unit loads, specifically for pieces of airplane luggage, that is provided with an optimized drive for moving the switch rails, in order to initiate the tilting movement of the tilting arms. This goal is achieved, as per the characteristics stated in Claim 1, with a tilting installation for unloading unit loads from containers. Advantageous further developments of the invention are indicated in the sub-claims 2 through 10.

In order to execute the containers' tilting movement, each tilting arm is provided with a lever arm that is pivotably joined outside its axis. Essentially, the lever arm is vertically aligned and is provided with a guide roller at its end facing away from the tilting arm. In order to hold the tilting arm in its horizontal transport position, the guide roller engages a guide rail that runs parallel to the stadium-shaped track. In order to be able to swing out the tilting arms, switchable rails have been provided along the guide rails, which are pivotable around a switching joint, whose axis is aligned horizontally and at right angles to the transport direction, and via which the guide rollers can be rerouted from the guiding rail to a tilting rail that is vertically off set in relation to the guiding rail. Due to the resulting traction or, respectively, the pressure force that is exerted on the lever arm in the vertical direction, the tilting arm and, consequently, the container attached to it, is swung out either to one or the other side of the tilting device. This development of the tilting mechanism has turned out to be very simple as to its structure/design, since, essentially, it is based on mechanical component parts. Furthermore, this type of mechanical solution is, relatively, much less trouble prone.

A switch rail—with its pivotably mounted switch element and arranged along the guide rail,—has been found to be advantageous. The length of this switch rail is approximately the same length as that of a container. This results in a relatively gentle tilting movement of the tilting arms and, thus, of the tilting container. The switch rail can be swung from its resting position to its operative position by means of a drive (actuator). In its operational position, the switch rail connects the guide rail with a tilting rail that is assigned to it.

As a drive for the swivel movement of the switch rail, the use of a flat cam gear with rectilinear and swivel joints of the Geneva-type stop has been found advantageous, since this guarantees that, both in the resting and the operational position of the tilting rail, the drive, which preferably consists of a series-connected electric motor, is not under torsional strain, and that the switch rail's supporting forces are fed directly into the gear's driving shaft, making the cam gear self-locking.

This cam gear is executed as a rotatable plate with a fixed stud, arranged on a driven shaft, that consists essentially of a stud—arranged off-set in relation to the driven shaft that engages the slot of a slotted disc that rotates coaxially to the rotatable stud plate. The slotted disc's end opposite the slot has a pivotably joined connecting tie rod that is connected to the switch rail, and which serves to convert the slotted disc's rotary movement into a lifting or lowering movement of the switch rail. In order to make possible the previously described self-locking of the cam gear, the rotatable stud plate, as well as the slotted disc have been provided with arch-shaped (curved) contact surfaces, which adjoin both in the resting and the operational position of the rotatable stud plate and the slotted disc and, thereby, relieve the stud. While between the two positions, the rotatable stud plate can be swiveled by 90°, and in both swivel positions of the slotted disc, the slot's longitudinal section is arranged tangentially to the stud's shaft and at a distance from it.

Furthermore, it is also advantageous to provide a double set of guide rails and tilting rails, which—seen in the transport direction—are located at the right and left side below the tracks. This allows a switching element to be provided on the left side at the beginning of the tilting device's track rails and to be followed shortly by a further switching element on the right side. The distance between switching elements corresponds to the spacing of the consecutively arranged tilting arms that jointly carry a container, which makes a simultaneous swing-out movement possible. Due to the staggered arrangement on the sides of the switching elements, it is possible to increase the speed of the traveling undercarriages, since the distance between the individual guide rollers is twice as long on one side of the tilting rails and, thus, there remains enough time—even at higher transporting speeds—to switch the switch rails into the desired position before the arrival of the next guide roller. For this purpose, the tilting arms that are arranged on the undercarriages are turned around by 180°, and—seen in the transport direction—guide rollers are provided which alternately engage the right-side or left-side rails.

The execution that allows the tilting arms to move along in the transport direction is achieved in that at least two tilting arms are assigned to a container during the entire tilting process and, thus, the tilting arm's return movement into the horizontal position occurs together with the container; this makes it unnecessary to allow for additional time for the return of the tilting arms, thus optimizing the flow/transfer rate or, respectively, the length of the tilting device. Transfer rates of 2500 containers per hour can be achieved with a tilting device of the described type.

An especially advantageous means of attaching the containers on the tilting arms is to arrange permanent magnets at the ends of the tilting arms, as well as a material that the magnetic force will hold, in particular steel sheet metal that is placed on the outer bottom surface, if the container is made of plastic. The connection between the permanent magnets and the container is easily undone at the end of the tilting movement by the tilting arms' downward tipping (dumping) out movement, and the container can safely be passed on to the subsequent conveyor belt. Due to the tilting movement—at the beginning and the end of the tilting device, seen in the transport direction—of the permanent magnets around an axis (oriented at right angles to the transport direction) that places them either into or out of their essentially horizontal position at the tilting arms, a gentle coupling and/or uncoupling process of the container is achieved. Furthermore, the disc-shaped design of the holding means—where one disc surface faces towards the container to be attached—and the slightly angled movable positioning of the holding means on the tilting arms, result in the contact of the holding means being as holohedral as possible at the containers' lower surface, and, consequently, the containers are held securely on the tilting arms and are held also during the tilting movement.

It has also proven to be an advantage that the undercarriages are provided with rollers, which roll on a stadium-shaped track—seen in the transport direction—, that the traction medium, together with the undercarriages arranged on it, is guided over/via two reversing guide wheels, which are positioned in the area at the ends of the track rails.

Below follows a detailed explanation of the invention, based on the attached drawings. Shown are in

SUMMARY

The invention refers to a tilting device for emptying containers carrying unit loads (in particular pieces of airplane luggage), which is arranged along the course of a conveyor belt; the tilting device has at least one adjoining branch-off conveyor; with tilting arms arranged consecutively and in the transport direction, which—in order to empty the containers—can all be swiveled sideways around an axis that extends mostly horizontally in the transport direction; the tilting device is also provided with at least two tilting arms for passing the containers on between the conveyor belts; at least two of the tilting arms are detachably connected to a container by holding means.

In order to create a container-emptying tilting device that has an optimized flow/transfer rate, it is proposed that for the tilting movement of the containers (2), each tilting arm (8) flexibly (articulated) engage—outside of its axis (19)—a coupling rod (12), that essentially is vertically aligned, and on whose end facing away from the tilting arm (8), a guide roller (14) is mounted, which—in order to hold the tilting arms (8) in their horizontal transport position—is carried/guided in a guiding rail (15) that proceeds parallel to a track rail (6); in order to swivel the tilting arms (8) around an axis (9), the guide roller (14) can be rerouted via a switchable switching element (17) to a tilting rail (16), arranged off-set to the guiding rail (15); the switching elements (17) consist of a switching rail (14) that, in its horizontal resting position, is arranged along the extent of the guiding rail (15); it can be swung, by means of a drive (32) into a swung-out operational position that connects the guiding rail (15) with the assigned tilting rail (16); the switching rail (41) can be swiveled via a cam gear of the Maltese Cross type. (See Illustration 4).

SUMMARY

The invention refers to a separating conveyor for the transfer of unit loads, in particular pieces of airplane luggage, from a conveyor belt (3), to at least one adjoining branching-off conveyor with—in the transport direction (F) consecutively arranged—traveling undercarriages (7), movable along a track rail (6), which—via a driven traction medium (4)—are interconnected to form an endless, revolving chain; the traveling undercarriages (7) are provided with tilting arms (8), each of which, in order to transfer to load units, can be swung sideways around a mostly horizontally (in the transport direction F) extending axis (9); for the tilting movement of the tilting arms (8) around the axis (9) via a switchable switching element (17), the guiding roller (14) can be rerouted to a tilting rail (16), that is off-set and vertically aligned to the guiding rail (15). The switching rail (41) can be swiveled by a cam gear of the Maltese Cross type, which is provided—aligned in the transport direction—with an impellable (drivable) pin disc (34), which by means of a pin (35) engages a slot (36) arranged on a slotted disc (37) which bears a tie rod (40), that converts the turning movement of the slotted disc (37) into a lifting or lowering movement of the switching rail (41). (See FIG. 4).

DESCRIPTION OF THE DRAWINGS

FIG. 6 is a top view of FIG. 4.

DESCRIPTION OF THE PREFERRED EMBODIMENTS

Figure 1:
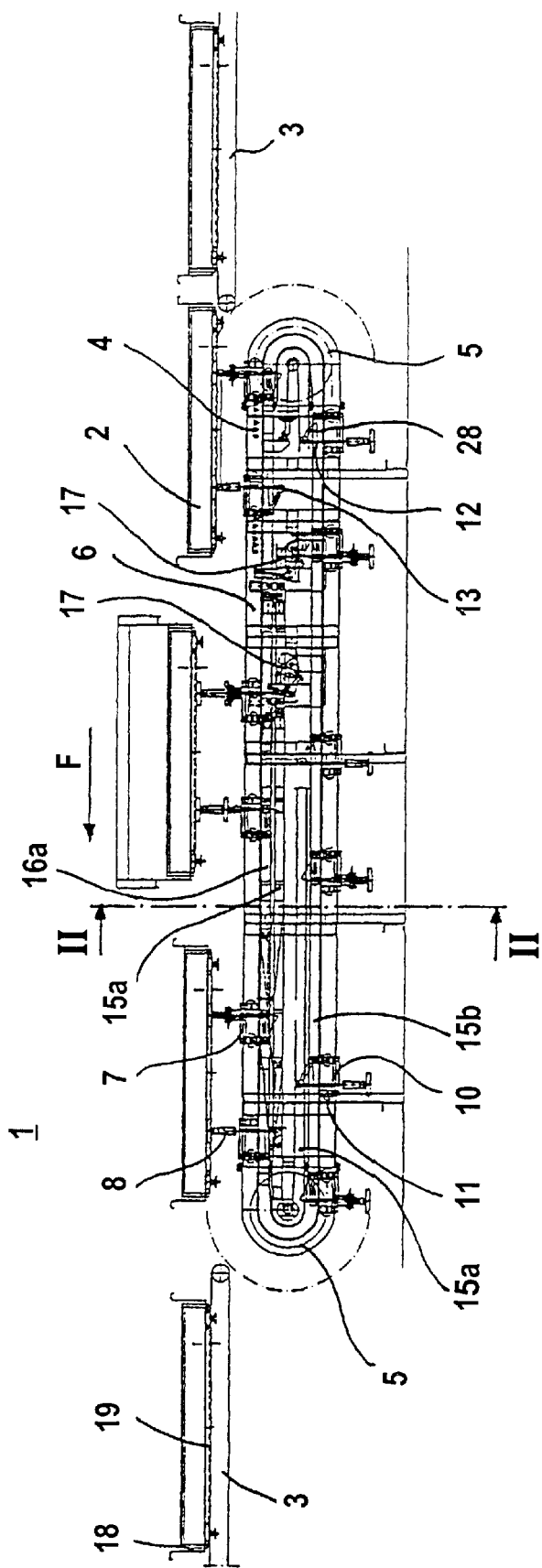
FIG. 1 is a lateral view of a separating conveyor—arranged along a unit load conveyor—to transfer transported pieces of airplane luggage.

FIG. 1 shows a lateral view of a tilting device 1 as per the invention, that serves to empty containers 2, in particular, containers transporting pieces of airplane luggage. The tilting device 1 is arranged along the path of a conveyor 3, which is executed, preferably, as a belt conveyor from which the transport containers are laterally removed by one belt each. The conveyor 3 serves to feed or carry away the containers to, or respectively from, the tilting device 1. The task of the tilting device 1 is to swivel the containers 2—unilaterally and at right angles to the transport direction F—in order to deliver/transfer the unit loads, transported by the containers, to branching off conveyors (not shown) which, preferably, will be designed/executed in the form of chutes.

Essentially, the tilting device 1 consists of an endless revolving traction device 4, which is guided at the beginning and end of the tilting device via guide wheels 5, and which are pivotably mounted on axes that extend horizontally and at right angles to the transport direction F. The traction medium 4 (shown only partially) is preferably designed as a chain and, accordingly, the guide wheels 5 will be designed as gear (sprocket) wheels. Between the gear wheels 5, the traction medium 4 is guided via open-sided guide rails 6 which extend in the transport direction F (see also FIGS. 3 and 4), whose guiding surfaces are made, preferably, of plastic. The traction medium 4 is provided with bolt-fastened (traveling) undercarriages 7, which, thus, can be driven in the transport direction F in the area of the upper stringer of the traction medium 4. A large number of traveling undercarriages 7 are arranged along the traction medium 4; their spacing (to each other) has been chosen in such a way that two subsequent undercarriages 7 in the transport direction will always form a pair, each of these pairs carrying a container 2. Each pair is spaced, in dependence of the length of the container 2, and keeps a minimum distance to the subsequent container 2. For the swiveling movement of the containers 2, a tilting arm 8 is attached to each traveling undercarriage 7; the tilting arm 8 is pivotably attached to an axis 9 that extends horizontally in the transport direction (see FIGS. 2 and 3).

Basically, the traveling undercarriage 7 consists of a frame 10, on which the tilting arm 8 is mounted via the axis 9. The description refers to a traveling undercarriage 7, that moves in the transport direction F, in the area of the traction medium's (4) upper stringer. Furthermore, the traveling undercarriage 7 is provided with 4 track rollers, 11, which—seen in the transport direction F—are arranged in consecutive pairs and, thus, also side by side (see also FIGS. 2 and 3). The track rollers 11 are arranged on the tilting device 1, and move in guide rails 6 which extend along the traction medium 4. Viewed laterally, the track 6 is stadium-shaped, i.e. it consists of two parallel, straight rails—that face each other, each of their ends being connected via a semi-circular rail.

The tilting movement of the tilting arms 8 is effected via a coupling rod 12—which is pivotably arranged on the tilting arm 8 in the transport direction F, via an axis 13 of a universal joint (see FIGS. 2 and 3), which essentially extends perpendicularly downwards. At the end of the coupling rod 12 that faces away from the tilting arm 8, a guide roller 14 has been arranged, which engages a guide rail 15a, 15b, that runs parallel to the track 6, and thus extends also in a stadium-shaped fashion. In order to move the tilting arms 8 from their horizontal transporting position to their tilting position, tilting rails 16a, 16b have been provided parallel to, and either above or below, the guide rails 15a, 15b. The guide rails 15a, 15b, and the tilting rails 16a, 16b are interconnected via switching elements 17a, 17b. By switching over the switching elements 17a, 17b, it becomes possible to initiate the tilting movement of the tilting arms 8, due to the rerouting of the guide roller 14 from the guide rail 15a, 15b to the tilting rail 16 assigned to the coupling rod 12, which is either pushed upwards or pulled downwards, thus swiveling/swinging out the tilting arm 8. ( Seemingly, in the original the word "Koppelstange" [coupling rod] was given the wrong gender, both in line 1 and 14 of page 14, i.e. "der" instead of "die"; the article "die" was used in the translation, because, otherwise, it would not have been possible to translate the two sentences).

Figure 2:
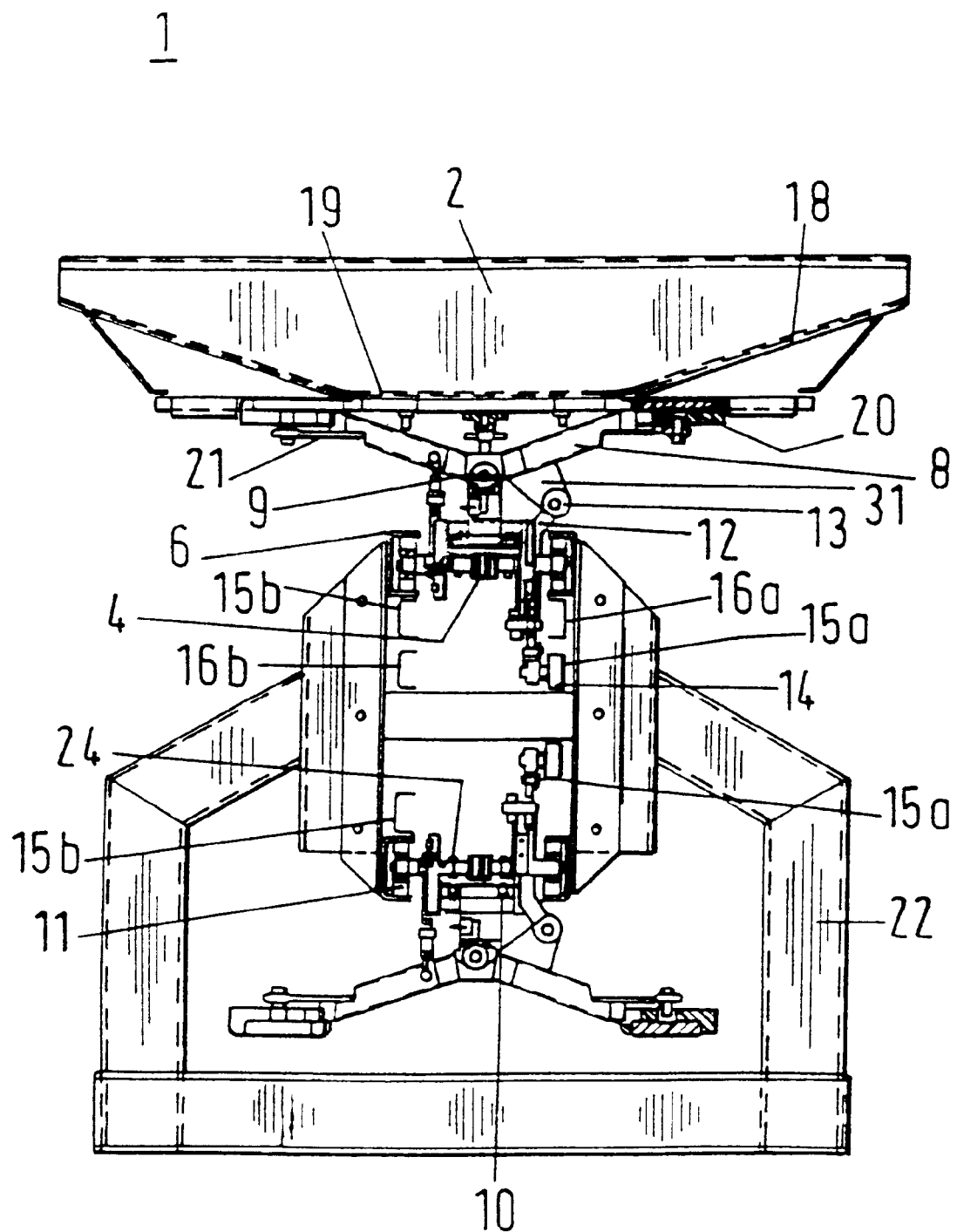
FIG. 2 is a view of a cross section of FIG. 1, along the section line 11—11.

FIG. 2 shows an enlarged sectional view of FIG. 1 along the cutting line 11—11, which—among others—shows the execution of the containers. The containers 2 are particularly suitable for an outward transfer/discharge of the transported unit loads—such as suitcases, backpacks or hold-ails—by tilting them at an angle of 45°. The term "tub-shaped" is to be understood in this context to mean that the containers 2 show side walls 18, erected at right angles to the transport direction F, which are aligned almost vertically to the bottom 19 of the container 2, in order to prevent the unit loads from leaving (falling out of) the container 2 during their transport on the conveyor belts 3 over upwards, downwards and curved stretches. In the present execution example, the inner side walls 18 of the container 2—aligned in transport direction F—are arranged at a wall 18 to bottom 19 angle of approximately 20°. This sloping design of the side wall 18 (not 19, as stated in the original) is helpful in sliding out the unit loads onto the adjoining branching off conveyor when the container 2 is being tilted.

During the transport movement of the tilting device in the transport direction F, the containers 2 are locked onto the tilting arm 8 via holding means 20, while, at the same time, the bottom 19 of the container 2 rests on the tilting arm 8. The holding means are designed preferably as permanent magnets and, accordingly, the container, that is preferably made of plastic, is provided with a sheet metal profile in the area on the outside of its bottom; this sheet metal profile also serves as protection of the plastic container 2.

It is also possible to design the holding means 20 in the form of a mechanical locking device and to provide the container 2 with corresponding recesses, or to utilize electromagnets.

Furthermore, FIG. 2 shows that the tracks 6 for the traveling undercarriages 7 are formed by two upright U-profiles, whose open sides face each other, and in which the outer side of the flange is arranged on the side of a support/bearing frame 23. In each case, the track rollers 11 of the traveling undercarriages 7 roll on the lower web of the U-profile-shaped tracks 6. The diameter of the track rollers 11 is chosen in such a way that a small clearance remains between the track rollers 11—resting on the lower web of the track 6—and the upper web of the track 6. This permits, on the one hand, that the track rollers 11 can roll on the track 6 without jamming, and on the other hand, that due to the lateral displacement of the container 2 during the tilting process, the tilting moment that is applied to the traveling carriage 7 can be absorbed by same, because the track roller 11, facing away from the protruding part of the tilting arm 8, lifts off from the lower web of the track 6, and then immediately comes to lie against the upper web of the track 6. As a result, the tilting forces resulting from the tilting moment are safely fed into the track 6 and the support frame. The side-by-side running track rollers 11 of the traveling undercarriage 7 are each located in sections, coaxially arranged to each other, of a running axle 23, which is connected to the frame 10 of the traveling undercarriage 7 between the track rollers 11. The frame 10 is bolt(24)-connected to the traction medium 4 by means of carrier/driver elements, which extend in the direction of the support frame 22, as well as downwards, when seen in reference to the upper traveling undercarriage 7. In the event that the traction medium 4 is fashioned as an inverted tooth-type chain, the bolt 24 will be of the laterally elongated type, used for a chain's side bars.

The tilting arm 8 consists, essentially, of a profile/section extending at right angles to the transport direction F which, in the center of its longitudinal range/extension is mounted on an axis 9 that proceeds in the transport direction F and, consequently, rests on the frame 10 of the traveling undercarriage 7. The holding elements 20 are arranged at the ends of the tilting arm 8 and serve also as an extension of same. The holding elements 20 are designed in the form of permanent magnets, and are connected to the tilting arm 8 via connection elements 21 of limited flexibility, specifically sheet metal strips. The flexible connection allows the entire surface area of the holding means 20 to be in contact with the lower surface of the bottom 19 of the container 2. This optimizes the holding force/capability of the holding element 20. It is also feasible to position the magnets in a pan or cup-shaped plastic element and to rigidly join it to the tilting arm 8, or to attach the holding elements 20 directly on the tilting arm 8.

Figure 3:
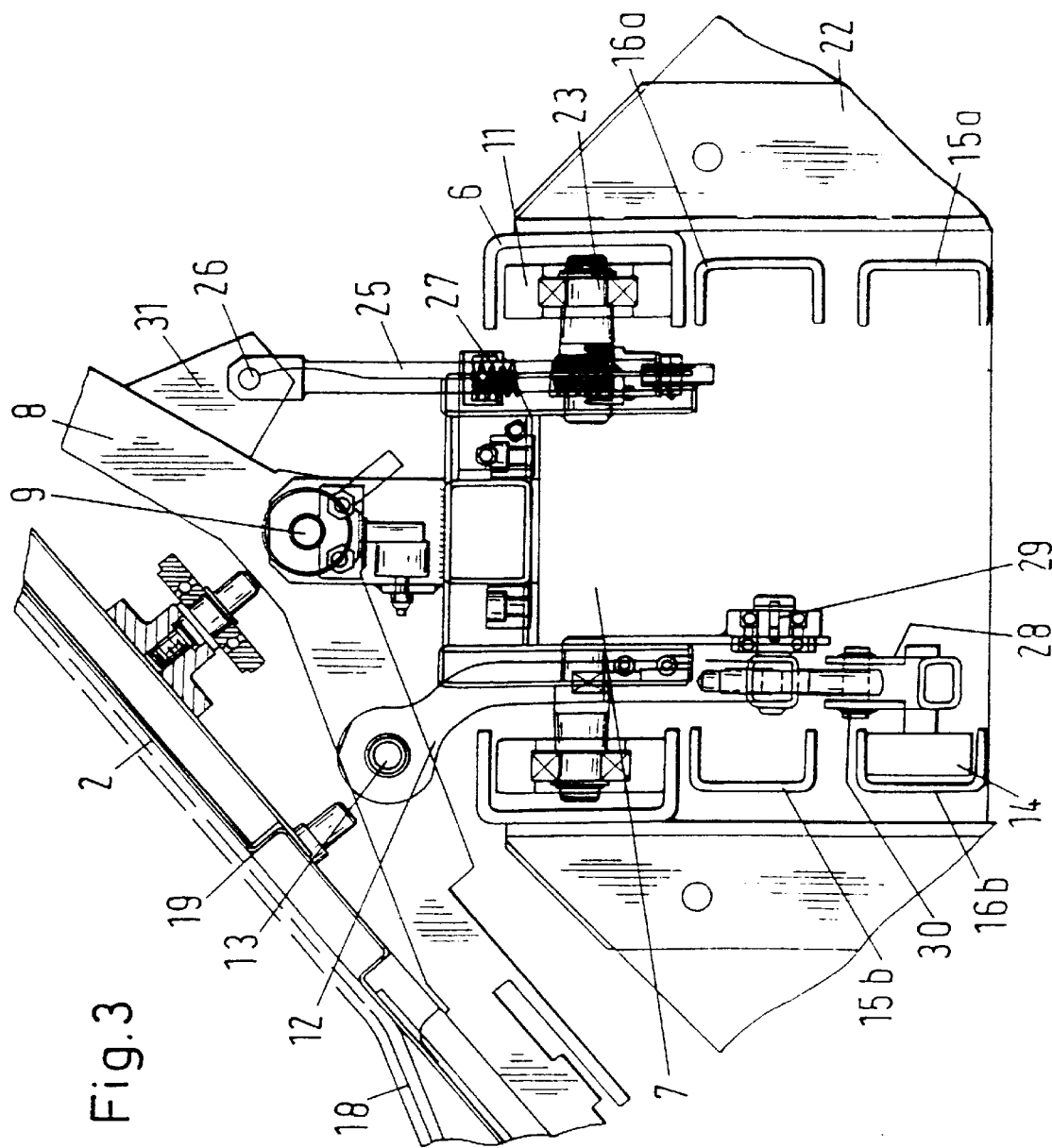
FIG. 3 is an enlarged detail of FIG. 1 from the area of the tilting actuator/drive, but with the tilting arm in its tilting position.

Furthermore, FIG. 2 shows the arrangement of the guide rails 15a, 15b, and of the tilting rails 16a and 16b. It can be seen that, in the transport direction F, in the area of the upper stringer of the traction medium 4 and below the tracks 6, a pair each of guide rails 15a, 15b with tilting rails 16a, 16b is provided. In the area of the lower stringer of the traction medium 4, only one guide rail 15a, 15b is arranged at each side of the tilting device 11, but no tilting rail 16a, 16b. FIG. 2 shows a traveling undercarriage 7 with a tilting arm 8, whose coupling rod 12 engages—via its guide roller 14, seen in the transport direction F—the guide rail 15a, arranged on the right side and, as needed, it engages its assigned tilting rail 16a. The traveling undercarriage 7 with the tilting arm 8 that follows in the transport direction F, is arranged—shown mirror-inverted—to the traveling undercarriage 7 shown in FIG. 2, with the two tilting arms 8 forming a pair in order to carry a container, so that the coupling rod 12 is articulation-fastened, via its axis 13, at the left side of the tilting arm 8 that is executed as a double arm. FIG. 3 shows the pair's other traveling undercarriage 7 in a swung out tilting position.

For the joint swivel movement of the two tilting arms 8, which in each case jointly carry a container 2, the foremost tilting arm 8 in the transport direction F can be swiveled due to the fact, that the guide roller 14 is rerouted, via a switching element 17a (see FIGS. 4 and 5) from the lower or respectively inner guide rails 15 at the right side, to the tilting rail 16a, arranged between the guide rail 15a and the track 6. As a result, the coupling rod 12 is moved vertically upwards, and the tilting arm 8 is swiveled counter clockwise by 45° around the axis 9.

Since in the area of the lower stringer of the traction means 4 there exists no need to swivel the tilting arms 8, only one guide rail 15a has been arranged on the right side, and one guide rail 15 on the left side, off-set upwards.

Compared with FIG. 3, which shows an enlarged detail of FIG. 2 of the tilting drive's (actuator's) area, but which shows (seen in the transport direction F) the rearmost traveling undercarriage 7 with one of the tilting arms 8 of the pair of tilting arms 8, it can be seen (viewed in the transport direction F) that the guide rail 15b that is arranged on the left side, and the tilting rail 16b, opposite it on the right side, have been interchanged. Thus, the tilting rail 16b is located below the guide rail 15b. This arrangement is also shown in FIG. 2, where in the area of the lower stringer of the traction means 4 it can be seen that the guide rail 15b is arranged at the left side in the neighboring area, and practically adjoining the track 6, and that the guide rail 15 at the right side is off-set—vertically upwards, by approximately the height of a tilting rail 16 plus a clearance—from the upper side of the lower track 6.

Furthermore, it can be seen in FIG. 3 that, at the side of the tilting arm 8 (fashioned as a double arm) that faces away from the coupling rod 12, a traction rod 25 is pivotably arranged on an axis 26 which extends in the transport direction F. In all positions of the tilting arm 8 the traction rod 25 is aligned essentially vertically, and its end facing away from the tilting arm 8 is supported, via a spring element, by the frame 10 of the traveling undercarriage 7. The task of this spring element 27 is to prestress/-tension the tilting arm 8 against the frame 10 of the traveling undercarriage 7, so that on the one hand in the horizontal transport position, but also in its sloping tilting position, the guide roller 14 proceeds along the U-shaped flange and open-sided guide rail 15a, 15b, or along the tilting rail 16a, 16b. This stabilizes the tilting arm 8 throughout the entire tilting process, as well as during the return movement in the area of the lower stringer of the traction element 4.

Furthermore, FIG. 3 shows that a trailing/drag arm 28 connects the guide roller 14, via an axis 29, to the end of the coupling rod 12 that faces away from the tilting arm 8. This trailing arm 28 is also shown in the lateral view in FIG. 4. The axis 29 is aligned horizontally and at right angles to the transport direction F.

Figure 4:
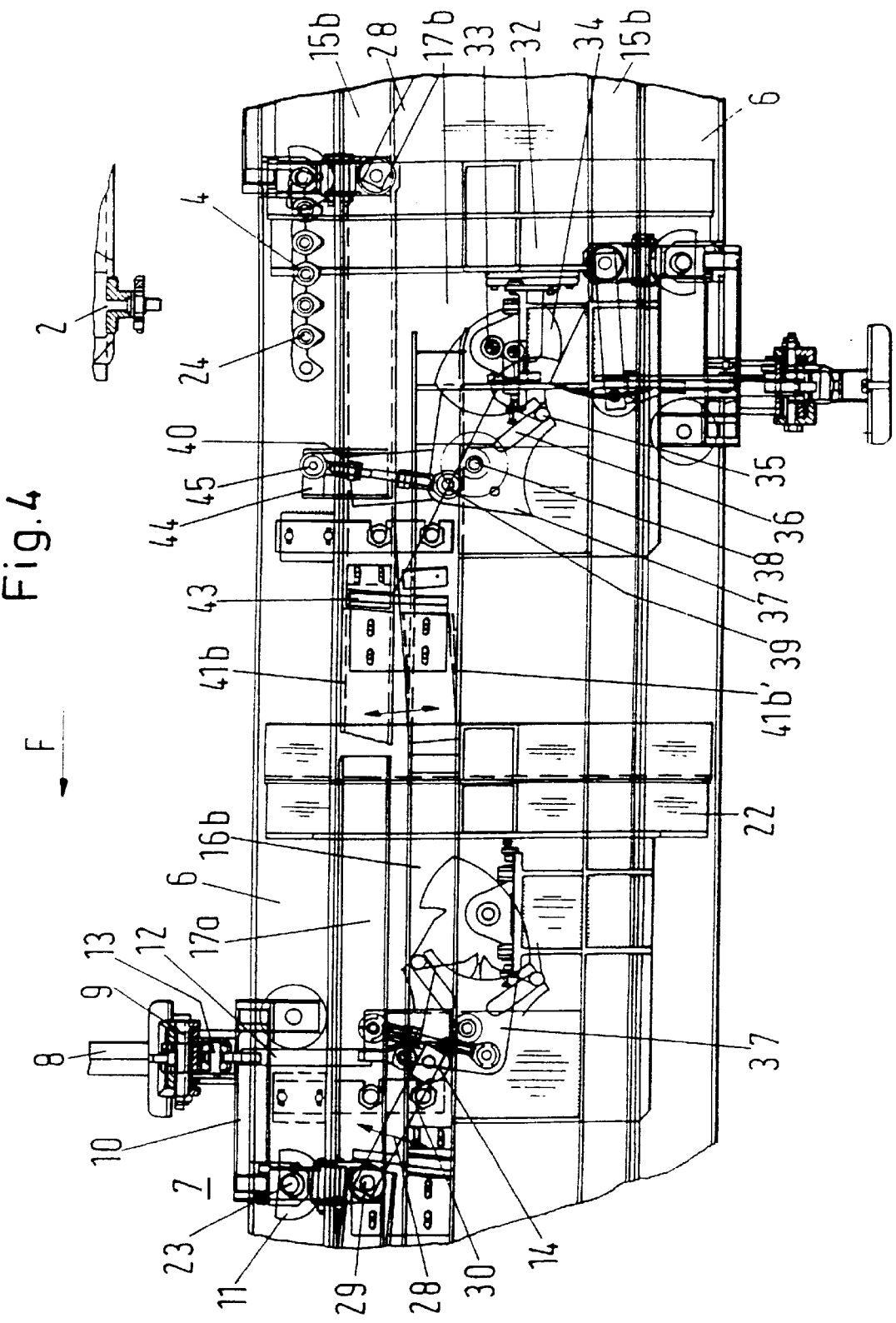
FIG. 4 is an enlarged detail of FIG. 1 from the area of the switching elements.

With regard to the seating of the coupling rod 12 at the trailing arm 28, the FIGS. 3 and 4 show that same is effected via an axis 30, aligned at right angles to the transport direction F. Both axes 13 and 30 are components of ball joints that serve to compensate for the set-offs that occur during the spatial movement of the tilting arm 8 during the tilting process. Due to the connection of the guide roller 14 to the frame 10 via the trailing arm 28, and the coupling rod engaging the trailing arm 28 above the seating of the guide roller 14, it is possible to omit an additional, vertically oriented guide for the coupling rod 12. Due to the trailing arm 28 being articulated—viewed in the transport direction F—at the front end of the frame 10, the guide roller 14 and the trailing arm 28 are being pulled behind the traveling undercarriage 7. This type of movement of the guide roller 14 in the guide rail 15 and the tilting rail 16 increases the stability of the swivel joint connection between the trailing arm 28 and the coupling rod 12.

Furthermore, by comparing FIGS. 2 and 3, it can be observed that, additionally, at one side of the tilting arm's 8 lever, a connecting metal sheet 31 is provided that is connected to the tilting arm 8 either via the traction rod 25 or the coupling rod 12, depending if it involves the front or rear tilting arm 8 of the pair of tilting arms 8 for the transport of a container 2. This achieves that identically fashioned coupling rods 12 can be used, even though on the sides facing each other, the guide rail 15a, 15b and the tilting rail 16a, 16b have been exchanged in the vertical direction and thus are vertically set off.

FIG. 4 shows an enlarged detail from FIG. 1 from the area of the two consecutively arranged (in the transport direction F) switching elements 17a and 17b, which basically consist of a drive 32 (see FIG. 6) and a flat cam gear with swivel and rectilinear joints of the Geneva stop type. The drive 32 consists of an electric motor with a series connected gear. The drive 32 is positioned at the support frame 22 of the tilting device 1, and its output side is connected to a shaft 33, (aligned horizontally and at right angles to the transport direction F) on which a rotatable plate 34 with fixed stud(s)is mounted. The studded plate's 34 function is that of a lever arm arranged on one side of the shaft 33. The end of the lever arm facing away from the shaft 33 is provided with a stud/pin 35 that is coaxially aligned to the shaft 33. Preferably, the stud 35 will be provided with a roller. The stud 35 engages the oblong-hole-shaped slot 36—open at one side—of a slotted disc 37, which is pivotably mounted on a further shaft 38 that is coaxially aligned to the shaft 33 of the studded plate/disc 34. The nearly square, slotted disc 37 is eccentrically mounted on the shaft 38, and has two concave contact surfaces 37' that serve for self-locking the cam gear in its final positions. In accordance with its function, the slotted disc 37 is designed as a double lever, where the slot 36 is arranged on one lever arm, and the slot's assumed elongation of its longitudinal extension centrally crosses the shaft 38. On the opposite lever arm of the slotted disc 37 and, thus, on the side opposite the slot 36, a connecting rod 40 is mounted via an axis 39, aligned coaxially to the shaft 38; the end of the connecting rod 40 facing away from the axis 39 is attached at a switch rail 41, via a further axis 45, which is aligned parallel to the axis 35. The stud-slot connection serves to swing out the switching rail 42; the anchoring of the switching rail 42 in its final positions is effected via the contact surfaces 34', 37'.

This switching rail 41 has a length, extending in the transport direction F, which roughly approximates the length of a container 2 and, via an articulated switch 42, it can be swiveled from its resting position—in which it is arranged along the guide trail 15b—to its operational position. In the operational position, the switching rail 41b connects the guide rail 15b with the tilting rail 16b and, seen in the transport direction F, it is arranged on a gradient (slope). The articulated switch 42 for the switching rail 41b is not shown in FIG. 4, since same, due to its length which achieves a gentle tilting movement of the containers 2, falls outside the right edge of the drawing. However, the switch joint 42 for the switching rail 41a can be seen in a top view in FIG. 4 and 6. In order to cut down on its length, the switching rail 41 is executed in two parts in the execution example. The first part is connected to the articulated switch 42, and a second part 41a is stationary attached at the beginning of the tilting rail 16b. In the operational position, the second part 41b is aligned at an angle to the tilting rail 16, in accordance with its alignment to the first part.

In FIG. 4, the switching rail 41b is shown in its horizontally proceeding resting position; the operational position of the switching rail 41b is only hinted at by the penciled in stationary end 41b'. Furthermore, FIG. 4 shows that the switching rail 41b, apart from being held by the switching joint 42, is also held at its front end in the vertical direction—facing away from the switching joint 42 and, thus, in the transport direction F—via guide elements 43. The guide elements 43 consist of a U-shaped part, attached to the support frame 22, whose open side (seen in the transport direction F) is frontwards oriented. The opening is engaged by a strip-shaped element that is attached to the switching rail 41. The connecting rod 40 engages the switching rail 41b near the guide elements 43 and at a distance from the switching joint 42.

Furthermore, FIG. 4 shows the corresponding execution of the switching rail 41a of the switching element 17a. Here as well, the switching rail 41a is shown in its resting position, and the operational position is only hinted at by the front end—seen in the transport direction F—of the stationary part of the switching rail 41a'. The slot 36 of the slotted disc 37 of the switching element 17a is not show here in its two feasible positions.

Figure 5:
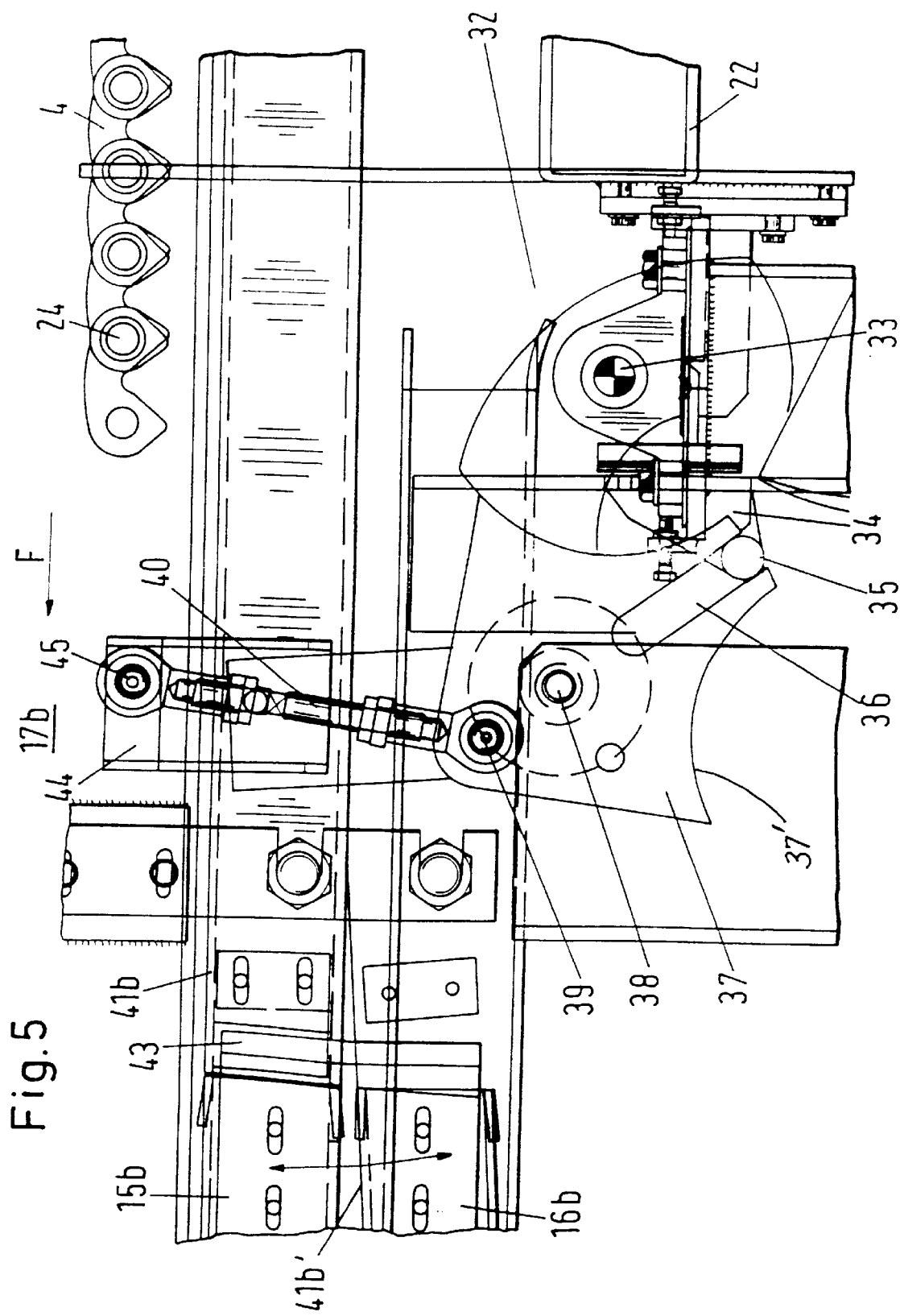
FIG. 5 is an enlarged detail of FIG. 4 from the area of a switching element's drive.

Using FIG. 5 as a guide—which shows an enlarged segment of FIG. 4 from the area of the switching element 17b—the following explanations offer more detail regarding the operational mode and the advantages of the motor 32 of the switching elements 17. The switching rail 41b is in its raised and horizontal position, so that the guide roller 14 of the coupling rods 12 of the traveling undercarriages 7 are guided along the guide rail 15b, and that, thus, the tilting arm 8 (not "18", as written in the original) is in its transport position. In this resting position, the switching rail 41b is held via the connecting/tie rod 40, which—for this purpose—is pivotably connected, via a connecting bracket 44 and the axis 41, to the switching rail 41b that is supported at one end by the slotted disc 37, which in its resting position is held by adjoining contact surfaces 34', 37' of the slotted disc 37 and the stud plate 34. Since the longitudinally extending slot 36 is aligned tangentially with/to the shaft 33, both in the operational as well as the resting position of the switching rail 41b, forces in the direction of the shaft 33 are fed only to the stud plate 34 via the contact surfaces 34', 37', and, thus, the motor 32 is not exposed to torsional strain. Therefore, this cam gear is described as being self-locking.

The lever conditions at the slotted disc 37 are chosen—in adaptation to the shifting path of the switching rail 41b—in such a way that also in the operational position of the stud plate 34 and the slotted disc 37 ( see FIG. 4, switching elements 17a), the longitudinal extension of the slot 36 is tangentially aligned with the shaft 33, and the contact surfaces 43', 37' adjoin. By turning the stud plate 34 by 90°, it will be possible to swivel the switching rail 41 out of its operational position and into its resting position or vice versa. Further to that, the gear connection of the switching rail 41 via the stud plate 34 and the slotted disc 37 has also the advantage—particularly in the case where a drive 32 is in the form of an electric motor—that very little start-up moment is required, since at the beginning of its movement the stud 35 moves relatively easily along the extent of the slot 36 in the longitudinal direction, and only with increasing swiveling of the stud plate 34 will the share of the force increase that is to be transferred to the side walls of the slot 36.

Furthermore, FIG. 5 shows that the length of the tie rod 40 can be adjusted. The result is that the transition from the end of the switching rail 41 to the beginning of the guide rail 15, or the tilting rail 16, is easily adjusted.

Furthermore, FIG. 6, which is a top view of FIG. 4, shows that the switching joint 42 is designed as a hinge joint. This hinge joint has a swivel axis, aligned horizontally and at right angles to the transport direction F, and it consists, basically, of an arm-shaped bearing element (attached to the support frame 22), which at the end facing away from the support frame 22, is provided with a drill hole for accommodating an axis; onto the end of the axis that protrudes from the end of the fastening element, a fork-shaped joint part is slipped that is bracket-connected to the switching rail 41*a*.

REFERENCE LIST

| | |
|---|---|
| 1 | Tilting Installation/Device |
| 2 | Container |
| 3 | Conveyor Belt |
| 4 | Traction means/medium |
| 5 | (Reversing) Guide Wheel |
| 6 | Track |
| 7 | Traveling Undercarriage |
| 8 | Tilting Arm |
| 9 | Axis |
| 10 | Frame |
| 11 | Track Rollers |
| 12 | Coupling/Tie Rod |
| 13 | Axis |
| 14 | Guiding Roller |
| 15a,b | Guiding Rail |
| 16a,b | Tilting Rail |
| 17a,b | Switching Elements |
| 18 | Side Wall |
| 19 | Bottom |
| 20 | Holding Means |
| 21 | Connection Element |
| 22 | Support Frame |
| 23 | Running Axis |
| 24 | Bolt |
| 25 | Pulling (Traction) Rod |
| 26 | Axis of 25 |
| 27 | Spring Element |
| 28 | Trailing/Drag Arm |
| 29 | Axis of 28 |
| 30 | Axis of 12 |
| 31 | Connector Metal Shoe |
| 32 | Drive |
| 33 | Shaft |
| 34 | (Driven) Pin/Stud Disc |
| 35 | Pin/Stud |
| 36 | Slot |
| 37 | Slotted Disc |
| 38 | Shaft |
| 39 | Axis |
| 40 | Connection Rod |
| 41a,b | Switching Rail |

-continued
REFERENCE LIST

| | |
|---|---|
| 42 | Switching joint |
| 43 | Guide Element |
| 44 | Connection Bracket |
| 45 | Axis |
| F | Transport Direction |

We claim:

1. A separating conveyor for the transfer of unit loads, in particular pieces of airplane luggage, from a conveyor belt (3), to at least one adjoining branch-off conveyor with, in the transport direction (F), consecutively arranged traveling undercarriages (7), movable along a track rail (6) which—via a driven traction medium (4)—are interconnected to form an endless revolving chain, said separating conveyor comprising:

a plurality of traveling undercarriages (7) on which tilting arms (8) are arranged, each of which, in order to transfer the load units, can be swung sideways around a mostly horizontally (in the transport direction F) extending axis (9);

where for the tilting movement of the tilting arms (8), each tilting arm (8) is engaged outside its axis (9) by an articulated/jointed coupling rod (12), which basically is vertically aligned, and at its end facing away from the tilting arm (8), a guiding roller (14) is mounted, which, in order to hold the tilting arms (8) in their horizontal transport position, is guided in a guiding rail (15) that extends parallel to the track rail (6), and where in order to swivel the tilting arms (8) around the axis (9), the guide roller (14) can be rerouted via a switchable switching element (17) to a tilting rail (16), arranged off-set to the guiding rail (15); and the switching elements (17) consist of a switching rail (41) that in its horizontal resting position is arranged along the extent of the guiding rail (15) and by means of a drive (32), can be swung into a swung-out operational position, that connects the guiding rail (15) with the assigned tilting rail (16), wherein the switching rail (41) can be swiveled via a cam gear of the Maltese Cross type, which shows a drivable stud/pin disc (34), aligned at right angles to the transport direction F, which—via a stud (35)—engages a slot (36) arranged in a slotted disc (37), and where, at the slotted disc (37), a connection rod (40) is supported that converts the rotary movement of the slotted disc (37) into a lifting or lowering movement of the switching rail (41).

2. The separating conveyor as per claim 1, wherein the holding means (20) are arranged at the lateral ends of the tilting arms.

3. The separating conveyor as per claim 1, wherein each of the unit loads is designed as a container (2) in which the goods to be transported, in particular pieces of airplane luggage, can be carried, and that at least two tilting arms (8), serving to pass on the containers (2) between the conveyor belts (3), are arranged on the container (2), the tilting arms (8) being detachably connected to the container (2) by holding means (20).

4. The separating conveyor as per claim 3, wherein the holding means (20) are arranged at the lateral ends of the tilting arms.

5. The separating conveyor as per claim 3, wherein the slot (36), with its assumed elongation of its longitudinal extension, crosses over the shaft (38) of the slotted disc (37), that in order to swing out the switching rail (41), the driven pin/stud disc (34) can be swiveled from its resting position to its operational position by approximately 90° and, that both in the operational and the resting position, the slot (36) is tangentially aligned with its longitudinal extent with the shaft (33) of the driven pin disc (34), and that furthermore, the contact surfaces (34', 37'), arranged on the driven pin disc (34) and the slotted disc (37), are adjoining for the purpose of self-locking the cam gear.

6. The separating conveyor as per claim 5, wherein the holding means (20) are executed as permanent magnets, and that the container (2) is magnetized at least in the area of its bottom contact surface.

7. The separating conveyor as per claim 6, wherein the holding means (20) are disc-shaped, with one of the disc surfaces facing towards the container (2) to be coupled; and
that they are pivotably mounted on the tilting arm (8) and that their angular movement is limited.

8. The separating conveyor as per claim 5, wherein that, seen in the transport direction (F), the left and the right side of the tilting device (1) are each provided with a guiding rail (15), a tilting rail (16) and a switching element (17), and that the coupling rods (12) alternately engage each side of the tilting arms (8), so that in each case the guide rollers (14) of the consecutively arranged traveling undercarriages (7) alternately engage the guiding rails (15) and the tilting rails (16) on the right and the left side.

9. The separating conveyor as per claim 8, wherein that via the holding means (20) arranged on the tilting arms, the containers (2) can be coupled to and uncoupled from the conveyor track for the purpose of receiving and/or passing them on, and that in their coupled condition, the containers (2) rest on the movable tilting arms (8).

10. The separating conveyor as per claim 9, wherein only one tilting arm (8) is arranged on each traveling undercarriage (7), and that—seen in the transport direction (F)—the distance between two tilting arms (8) is adapted to the length of the containers (2) in such a way that a container (2) can be carried by two tilting arms (8).

11. The separating conveyor as per claim 9, wherein the traveling undercarriages (7) are provided with track rollers (11), which—seen in the transport direction (F)—travel along stadium-shaped track rails (6), and that the traction medium (4) is guided around two reversing (return) guide wheels (5), which are arranged in the area of the ends of the track rails (6).

12. The separating conveyor as per claim 11, wherein only one tilting arm (8) is arranged on each traveling undercarriage (7), and that—seen in the transport direction (F)—the distance between two tilting arms (8) is adapted to the length of the containers (2) in such a way that a container (2) can be carried by two tilting arms (8).

13. The separating conveyor as per claim 8, wherein the traveling undercarriages (7) are provided with track rollers (11), which—seen in the transport direction (F)—travel along stadium-shaped track rails (6), and that the traction medium (4) is guided around two reversing (return) guide wheels (5), which are arranged in the area of the ends of the track rails (6).

14. The separating conveyor as per claim 13, wherein only one tilting arm (8) is arranged on each traveling undercarriage (7), and that—seen in the transport direction (F)—the distance between two tilting arms (8) is adapted to the length of the containers (2) in such a way that a container (2) can be carried by two tilting arms (8).

15. The separating conveyor as per claim 8, wherein only one tilting arm (8) is arranged on each traveling undercarriage (7), and that—seen in the transport direction (F)—the distance between two tilting arms (8) is adapted to the length of the containers (2) in such a way that a container (2) can be carried by two tilting arms (8).

16. The separating conveyor as per claim 5, wherein that via the holding means (20) arranged on the tilting arms, the containers (2) can be coupled to and uncoupled from the conveyor track for the purpose of receiving and/or passing them on, and that in their coupled condition, the containers (2) rest on the movable tilting arms (8).

17. The separating conveyor as per claim 16, wherein the traveling undercarriages (7) are provided with track rollers (11), which—seen in the transport direction (F)—travel along stadium-shaped track rails (6), and that the traction medium (4) is guided around two reversing (return) guide wheels (5), which are arranged in the area of the ends of the track rails (6).

18. The separating conveyor as per claim 17, wherein only one tilting arm (8) is arranged on each traveling undercarriage (7), and that—seen in the transport direction (F)—the distance between two tilting arms (8) is adapted to the length of the containers (2) in such a way that a container (2) can be carried by two tilting arms (8).

19. The separating conveyor as per claim 16, wherein only one tilting arm (8) is arranged on each traveling undercarriage (7), and that—seen in the transport direction (F)—the distance between two tilting arms (8) is adapted to the length of the containers (2) in such a way that a container (2) can be carried by two tilting arms (8).

20. The separating conveyor as per claim 5 wherein the traveling undercarriages (7) are provided with track rollers (11), which—seen in the transport direction (F)—travel along stadium-shaped track rails (6), and that the traction medium (4) is guided around two reversing (return) guide wheels (5), which are arranged in the area of the ends of the track rails (6).

21. The separating conveyor as per claim 20, wherein only one tilting arm (8) is arranged on each traveling undercarriage (7), and that—seen in the transport direction (F)—the distance between two tilting arms (8) is adapted to the length of the containers (2) in such a way that a container (2) can be carried by two tilting arms (8).

22. The separating conveyor as per claim 5, wherein only one tilting arm (8) is arranged on each traveling undercarriage (7), and that—seen in the transport direction (F)—the distance between two tilting arms (8) is adapted to the length of the containers (2) in such a way that a container (2) can be carried by two tilting arms (8).

23. The separating conveyor as per claim 5, wherein the holding means (20) are arranged at the lateral ends of the tilting arms.

24. The separating conveyor as per claim 3, wherein that, seen in the transport direction (F), the left and the right side of the tilting device (1) are each provided with a guiding rail (15), a tilting rail (16) and a switching element (17), and that the coupling rods (12) alternately engage each side of the tilting arms (8), so that in each case the guide rollers (14) of the consecutively arranged traveling undercarriages (7) alternately engage the guiding rails (15) and the tilting rails (16) on the right and the left side.

25. The separating conveyor as per claim 24, wherein that via the holding means (20) arranged on the tilting arms, the containers (2) can be coupled to and uncoupled from the conveyor track for the purpose of receiving and/or passing them on, and that in their coupled condition, the containers (2) rest on the movable tilting arms (8).

26. The separating conveyor as per claim 25, wherein the traveling undercarriages (7) are provided with track rollers (11), which—seen in the transport direction (F)—travel along stadium-shaped track rails (6), and that the traction medium (4) is guided around two reversing (return) guide wheels (5), which are arranged in the area of the ends of the track rails (6).

27. The separating conveyor as per claim 26, wherein only one tilting arm (8) is arranged on each traveling undercarriage (7), and that—seen in the transport direction (F)—the distance between two tilting arms (8) is adapted to the length of the containers (2) in such a way that a container (2) can be carried by two tilting arms (8).

28. The separating conveyor as per claim 25, wherein only one tilting arm (8) is arranged on each traveling undercarriage (7), and that—seen in the transport direction (F)—the distance between two tilting arms (8) is adapted to the length of the containers (2) in such a way that a container (2) can be carried by two tilting arms (8).

29. The separating conveyor as per claim 24, wherein the traveling undercarriages (7) are provided with track rollers (11), which—seen in the transport direction (F)—travel along stadium-shaped track rails (6), and that the traction medium (4) is guided around two reversing (return) guide wheels (5), which are arranged in the area of the ends of the track rails (6).

30. The separating conveyor as per claim 29, wherein only one tilting arm (8) is arranged on each traveling undercarriage (7), and that—seen in the transport direction (F)—the distance between two tilting arms (8) is adapted to the length of the containers (2) in such a way that a container (2) can be carried by two tilting arms (8).

31. The separating conveyor as per claim 24, wherein only one tilting arm (8) is arranged on each traveling undercarriage (7), and that—seen in the transport direction (F)—the distance between two tilting arms (8) is adapted to the length of the containers (2) in such a way that a container (2) can be carried by two tilting arms (8).

32. The separating conveyor as per claim 3, wherein that via the holding means (20) arranged on the tilting arms, the containers (2) can be coupled to and uncoupled from the conveyor track for the purpose of receiving and/or passing them on, and that in their coupled condition, the containers (2) rest on the movable tilting arms (8).

33. The separating conveyor as per claim 32, wherein the traveling undercarriages (7) are provided with track rollers (11), which—seen in the transport direction (F)—travel along stadium-shaped track rails (6), and that the traction medium (4) is guided around two reversing (return) guide wheels (5), which are arranged in the area of the ends of the track rails (6).

34. The separating conveyor as per claim 33, wherein only one tilting arm (8) is arranged on each traveling undercarriage (7), and that—seen in the transport direction (F)—the distance between two tilting arms (8) is adapted to the length of the containers (2) in such a way that a container (2) can be carried by two tilting arms (8).

35. The separating conveyor as per claim 32, wherein only one tilting arm (8) is arranged on each traveling undercarriage (7), and that—seen in the transport direction (F)—the distance between two tilting arms (8) is adapted to the length of the containers (2) in such a way that a container (2) can be carried by two tilting arms (8).

36. The separating conveyor as per claim 3, wherein the traveling undercarriages (7) are provided with track rollers (1), which—seen in the transport direction (F)—travel along stadium-shaped track rails (6), and that the traction medium (4) is guided around two reversing (return) guide wheels (5), which are arranged in the area of the ends of the track rails (6).

37. The separating conveyor as per claim 36, wherein only one tilting arm (8) is arranged on each traveling undercarriage (7), and that—seen in the transport direction (F)—the distance between two tilting arms (8) is adapted to the length of the containers (2) in such a way that a container (2) can be carried by two tilting arms (8).

38. The separating conveyor as per claim 3, wherein only one tilting arm (8) is arranged on each traveling undercarriage (7), and that—seen in the transport direction (F)—the distance between two tilting arms (8) is adapted to the length of the containers (2) in such a way that a container (2) can be carried by two tilting arms (8).

39. The separating conveyor as per claim 3, wherein the holding means (20) are executed as permanent magnets, and that the container (2) is magnetized at least in the area of its bottom contact surface.

40. The separating conveyor as per claim 39, wherein the holding means (20) are disc-shaped, with one of the disc surfaces facing towards the container (2) to be coupled; and
    that they are pivotably mounted on the tilting arm (8) and
    that their angular movement is limited.

41. The separating conveyor as per claim 1, wherein that, seen in the transport direction (F), the left and the right side of the tilting device (1) are each provided with a guiding rail (15), a tilting rail (16) and a switching element (17), and that the coupling rods (12) alternately engage each side of the tilting arms (8), so that in each case the guide rollers (14) of the consecutively arranged traveling undercarriages (7) alternately engage the guiding rails (15) and the tilting rails (16) on the right and the left side.

42. The separating conveyor as per claim 41, wherein that via the holding means (20) arranged on the tilting arms, the containers (2) can be coupled to and uncoupled from the conveyor track for the purpose of receiving and/or passing them on, and that in their coupled condition, the containers (2) rest on the movable tilting arms (8).

43. The separating conveyor as per claim 42, wherein the traveling undercarriages (7) are provided with track rollers (11), which—seen in the transport direction (F)—travel along stadium-shaped track rails (6), and that the traction medium (4) is guided around two reversing (return) guide wheels (5), which are arranged in the area of the ends of the track rails (6).

44. The separating conveyor as per claim 43, wherein only one tilting arm (8) is arranged on each traveling undercarriage (7), and that—seen in the transport direction (F)—the distance between two tilting arms (8) is adapted to the length of the containers (2) in such a way that a container (2) can be carried by two tilting arms (8).

45. The separating conveyor as per claim 42, wherein only one tilting arm (8) is arranged on each traveling undercarriage (7), and that—seen in the transport direction (F)—the distance between two tilting arms (8) is adapted to the length of the containers (2) in such a way that a container (2) can be carried by two tilting arms (8).

46. The separating conveyor as per claim 41, wherein the traveling undercarriages (7) are provided with track rollers (11), which—seen in the transport direction (F)—travel along stadium-shaped track rails (6), and that the traction medium (4) is guided around two reversing (return) guide wheels (5), which are arranged in the area of the ends of the track rails (6).

47. The separating conveyor as per claim 46, wherein only one tilting arm (8) is arranged on each traveling undercarriage (7), and that—seen in the transport direction (F)—the distance between two tilting arms (8) is adapted to the length of the containers (2) in such a way that a container (2) can be carried by two tilting arms (8).

48. The separating conveyor as per claim 41, wherein only one tilting arm (8) is arranged on each traveling undercarriage (7), and that—seen in the transport direction (F)—the distance between two tilting arms (8) is adapted to the length of the containers (2) in such a way that a container (2) can be carried by two tilting arms (8).

49. The separating conveyor as per claim 41, wherein the holding means (20) are executed as permanent magnets, and that the container (2) is magnetized at least in the area of its bottom contact surface.

50. The separating conveyor as per claim 44, wherein the holding means (20) are disc-shaped, with one of the disc surfaces facing towards the container (2) to be coupled; and that they are pivotably mounted on the tilting arm (8) and that their angular movement is limited.

51. The separating conveyor as per claim 44, wherein the holding means (20) are arranged at the lateral ends of the tilting arms.

52. The separating conveyor as per claim 1, wherein that via the holding means (20) arranged on the tilting arms, the containers (2) can be coupled to and uncoupled from the conveyor track for the purpose of receiving and/or passing them on, and that in their coupled condition, the containers (2) rest on the movable tilting arms (8).

53. The separating conveyor as per claim 52, wherein the traveling undercarriages (7) are provided with track rollers (11), which—seen in the transport direction (F)—travel along stadium-shaped track rails (6), and that the traction medium (4) is guided around two reversing (return) guide wheels (5), which are arranged in the area of the ends of the track rails (6).

54. The separating conveyor as per claim 53, wherein only one tilting arm (8) is arranged on each traveling undercarriage (7), and that—seen in the transport direction (F)—the distance between two tilting arms (8) is adapted to the length of the containers (2) in such a way that a container (2) can be carried by two tilting arms (8).

55. The separating conveyor as per claim 52, wherein only one tilting arm (8) is arranged on each traveling undercarriage (7), and that—seen in the transport direction (F)—the distance between two tilting arms (8) is adapted to the length of the containers (2) in such a way that a container (2) can be carried by two tilting arms (8).

56. The separating conveyor as per claim 5, wherein the holding means (20) are executed as permanent magnets, and that the container (2) is magnetized at least in the area of its bottom contact surface.

57. The separating conveyor as per claim 46, wherein the holding means (20) are disc-shaped, with one of the disc surfaces facing towards the container (2) to be coupled; and that they are pivotably mounted on the tilting arm (8) and that their angular movement is limited.

58. The separating conveyor as per claim 52, wherein the holding means (20) are arranged at the lateral ends of the tilting arms.

59. The separating conveyor as per claim 1, wherein the traveling undercarriages (7) are provided with track rollers (11), which—seen in the transport direction (F)—travel along stadium-shaped track rails (6), and that the traction medium (4) is guided around two reversing (return) guide wheels (5), which are arranged in the area of the ends of the track rails (6).

60. The separating conveyor as per claim 59, wherein only one tilting arm (8) is arranged on each traveling undercarriage (7), and that—seen in the transport direction (F)—the distance between two tilting arms (8) is adapted to the length of the containers (2) in such a way that a container (2) can be carried by two tilting arms (8).

61. The separating conveyor as per claim 59, wherein the holding means (20) are executed as permanent magnets, and that the container (2) is magnetized at least in the area of its bottom contact surface.

62. The separating conveyor as per claim 61, wherein the holding means (20) are disc-shaped, with one of the disc surfaces facing towards the container (2) to be coupled; and that they are pivotably mounted on the tilting arm (8) and that their angular movement is limited.

63. The separating conveyor as per claim 59, wherein the holding means (20) are arranged at the lateral ends of the tilting arms.

64. The separating conveyor as per claim 1, wherein only one tilting arm (8) is arranged on each traveling undercarriage (7), and that—seen in the transport direction (F)—the distance between two tilting arms (8) is adapted to the length of the containers (2) in such a way that a container (2) can be carried by two tilting arms (8).

65. The separating conveyor as per claim 64, wherein the holding means (20) are executed as permanent magnets, and that the container (2) is magnetized at least in the area of its bottom contact surface.

66. The separating conveyor as per claim 65, wherein the holding means (20) are disc-shaped, with one of the disc surfaces facing towards the container (2) to be coupled; and that they are pivotably mounted on the tilting arm (8) and that their angular movement is limited.

67. The separating conveyor as per claim 64, wherein the holding means (20) are arranged at the lateral ends of the tilting arms.

68. The separating conveyor as per claim 1, wherein the holding means (20) are executed as permanent magnets, and that the container (2) is magnetized at least in the area of its bottom contact surface.

69. The separating conveyor as per claim 68, wherein the holding means (20) are arranged at the lateral ends of the tilting arms.

70. The separating conveyor as per claim 68, wherein the holding means (20) are disc-shaped, with one of the disc surfaces facing towards the container (2) to be coupled; and that they are pivotably mounted on the tilting arm (8) and that their angular movement is limited.

71. The separating conveyor as per claim 70, wherein the holding means (20) are arranged at the lateral ends of the tilting arms.

* * * * *

UNITED STATES PATENT AND TRADEMARK OFFICE
CERTIFICATE OF CORRECTION

PATENT NO. : 6,502,687 B1
DATED : January 7, 2003
INVENTOR(S) : Erwin Ayen, Wolfgang Grein and Heinrich Droste It is certified that error appears in the above-identified patent and that said Letters Patent is hereby corrected as shown below:

Column 6,
Line 50, "hold-ails" should be -- hold-alls --.

Column 14,
Line 30, insert -- , -- after "claim 5".

Column 15,
Line 64, "(1)" should be -- (11) --.

Column 17,
Line 11, "claim 44" should be -- claim 49 --.
Line 16, "claim 44" should be -- claim 41 --.
Line 44, "claim 5" should be -- claim 52 --.

Signed and Sealed this

Twenty-seventh Day of September, 2005

JON W. DUDAS
*Director of the United States Patent and Trademark Office*